(12) United States Patent
Delbeke et al.

(10) Patent No.: US 11,262,267 B2
(45) Date of Patent: Mar. 1, 2022

(54) HERMETICITY TESTING OF AN OPTICAL ASSEMBLY

(71) Applicant: Indigo Diabetes N.V., Zwijnaarde (BE)

(72) Inventors: Danaë Delbeke, Gentbrugge (BE); Paolo Cardile, Ghent (BE); Juan Sebastian Ordonez Orellana, Ghent (BE); Ananth Subramanian, Mariakerke (BE)

(73) Assignee: Indigo Diabetes N.V., Zwijnaarde (BE)

( * ) Notice: Subject to any disclaimer, the term of this patent is extended or adjusted under 35 U.S.C. 154(b) by 217 days.

(21) Appl. No.: 16/500,099

(22) PCT Filed: Mar. 30, 2018

(86) PCT No.: PCT/EP2018/058306
§ 371 (c)(1),
(2) Date: Oct. 2, 2019

(87) PCT Pub. No.: WO2018/185029
PCT Pub. Date: Oct. 11, 2018

(65) Prior Publication Data
US 2021/0102860 A1 Apr. 8, 2021

(30) Foreign Application Priority Data
Apr. 3, 2017 (EP) .................. 17164570

(51) Int. Cl.
*G01M 3/04* (2006.01)
*G02B 6/42* (2006.01)

(52) U.S. Cl.
CPC ............ *G01M 3/04* (2013.01); *G02B 6/4248* (2013.01)

(58) Field of Classification Search
CPC ...................................................... G01M 3/04
See application file for complete search history.

(56) References Cited

U.S. PATENT DOCUMENTS 5,833,603 A * 11/1998 Kovacs ............ A61B 1/00016
600/317
7,338,215 B2   3/2008 Reynolds
(Continued)

FOREIGN PATENT DOCUMENTS

JP   H04140629 A   5/1992
WO   2012/002792 A2   1/2012

OTHER PUBLICATIONS

Xu et al., "Ultra-sensitive chip-based photonic temperature sensor using ring resonator structures", published Feb. 3, 2014, vol. 22, No. 3 | DOI:10.1364/OE.22.003098.
(Continued)

*Primary Examiner* — David A. Rogers
(74) *Attorney, Agent, or Firm* — N.V. Nederlandsch Octrooibureau; Catherine A. Shultz; Katelyn J. Bernier

(57) ABSTRACT

A method for testing an optical assembly (1) which has an optical microstructure (3) integrated with a substrate (2). The optical microstructure (3) is positioned to form an external optical interaction area (4) on a part of a surface (5) of the substrate (2). A cover cap (6) seals at least a part of the surface (5) of the substrate (2) adjacent to the optical microstructure (3) to obtain a sealed cavity (9). An optical feedthrough (10) is integrated in the substrate (2) to form an external communication path from within the sealed cavity (9). The optical feedthrough (10) allows communication of a physical parameter value which is measured inside the sealed cavity (9) to outside the sealed cavity (9). The physical parameter value is associated with a measure of hermeticity of the sealed cavity (9).

15 Claims, 2 Drawing Sheets

(56) References Cited

U.S. PATENT DOCUMENTS

| | | | |
|---|---|---|---|
| 8,285,086 B2* | 10/2012 | Nishikawa | G01N 21/774 385/12 |
| 8,528,397 B2 | 9/2013 | Stamper | |
| 10,105,081 B2* | 10/2018 | Delbeke | A61B 5/1455 |
| 10,408,644 B2* | 9/2019 | Miyashita | G01B 11/16 |
| 2006/0260402 A1* | 11/2006 | Kim | G01H 11/08 73/587 |
| 2007/0196923 A1 | 8/2007 | Gueissaz et al. | |
| 2009/0154872 A1 | 6/2009 | Sberrer et al. | |
| 2011/0137142 A1* | 6/2011 | Lucisano | A61B 5/1473 600/347 |
| 2012/0042714 A1 | 2/2012 | Stamper | |
| 2014/0177058 A1* | 6/2014 | Koike | G02B 5/284 359/578 |
| 2014/0326053 A1* | 11/2014 | Mendoza Machain | G01M 3/36 73/49.3 |
| 2017/0016819 A1* | 1/2017 | Barwicz | G01J 3/0256 |
| 2018/0180829 A1* | 6/2018 | Gudeman | H01S 5/02255 |
| 2019/0069815 A1* | 3/2019 | Burnes | A61B 5/4381 |
| 2019/0076070 A1* | 3/2019 | Nogueira | G16H 20/17 |
| 2019/0172964 A1* | 6/2019 | Hermes | G01S 7/4816 |
| 2019/0255335 A1* | 8/2019 | Barror | A61N 1/3758 |
| 2019/0350502 A1* | 11/2019 | Bohm | A61B 5/14532 |
| 2019/0380628 A1* | 12/2019 | Routh | G16H 40/67 |
| 2020/0137910 A1* | 4/2020 | Nielsen | H05K 5/0086 |
| 2020/0187832 A1* | 6/2020 | Ordonez Orellana | G01M 3/186 |
| 2020/0277215 A1* | 9/2020 | Najafi | C03C 15/00 |
| 2021/0025761 A1* | 1/2021 | Altenbeck | H01L 31/0203 |
| 2021/0045260 A1* | 2/2021 | Day | H05K 5/0086 |

OTHER PUBLICATIONS

Kolpakov et al., "Toward a New Generation of Photonic Humidity Sensors", Sensors 2014, 14, 3986-4013; doi:10.3390/s140303986, ISSN 1424-8220, www.mdpi.com/journal/sensors.

Klimov et al., "Towards Reproducible Ring Resonator Based Temperature Sensors", Thermodynamic Metrology Group, National Institute of Standards and Technology, Gaithersburg, MD 20899, USA, Sensors & Transducers, vol. 191, Issue 8, Aug. 2015, pp. 63-66, www.sensorsportal.com.

Hung et al., "Optical System for Fast Inspection of Hermetic Seals in Electronic Packages", Proc. ISOT, pp. 1-4, Oct. 2010.

Tao et al., "An ultrahigh-accuracy Miniature Dew Point Sensor based on an Integrated Photonics Platform", Sci Rep 6, 29672; doi: 10.1038/srep29672 (2016).

* cited by examiner

HERMETICITY TESTING OF AN OPTICAL ASSEMBLY

FIELD OF THE INVENTION

The present invention relates to a method for testing an optical assembly, e.g. an optical assembly such as an optical sensor being used in harsh environments. In a further aspect, the present invention relates to an optical assembly comprising a substrate with an optical microstructure in the substrate.

BACKGROUND ART

U.S. Pat. No. 8,528,397 B2 discloses a MEMS based hermeticity sensor. A device includes an optical beam positioned within a substantially hermetically sealed cavity. In one embodiment the hermeticity sensor may include an optical measurer configured to measure an amount of deflection in beam caused by the change in stress. A related method of sensing the hermeticity of a device is also provided.

SUMMARY OF THE INVENTION

The present invention seeks to provide a means for testing the reliability of an enclosure of an optical assembly with an integrated optical microstructure which is hermetically sealed. More in particular, the present invention seeks to provide means for testing the hermeticity of an enclosure of an optical assembly in a cost effective manner, at various stages ranging from its manufacturing to implementation.

According to the present invention, means for testing as defined above is provided, wherein the optical microstructure is positioned in the substrate to form an external optical interaction area on a part of a surface of the substrate, the method further comprising sealing a cover cap to at least a part of a surface of the substrate adjacent to the optical microstructure, thereby obtaining a sealed cavity, providing an optical feedthrough integrated in the substrate, the optical feedthrough forming an external communication path from within the sealed cavity, measuring a physical parameter value inside the sealed cavity, the associated physical parameter being a measure of hermeticity of the sealed cavity, and communicating the measured physical parameter value via the optical feedthrough.

Prior art methods to detect leaks in a hermetic package either use expensive sensors, such as quartz crystals, and/or use specific tracer gases for allowing performing of e.g. mass spectrometry. Most of these methods are not suited for the implementation on miniaturized packages or do not provide the sensitivity required to detect and evaluate leaks in a reliable way that enables life-time estimations of the functionality of the optical assembly at its various life stages.

In embodiments according to the invention, a method is provided for testing an optical assembly, comprising: —providing a substrate with an optical microstructure integrated with the substrate, the optical microstructure comprising one or more integrated optical components which are fully or partially embedded, integrated or patterned in the substrate and which are positioned to form an optical interaction area above a part of a surface of the substrate; —sealing a cover cap to at least a part of a surface of the substrate adjacent to the optical microstructure, thereby obtaining a sealed cavity: —providing a physical parameter sensor arrangement for measuring a physical parameter inside the sealed cavity which is a measure of hermeticity of the sealed cavity; —providing an optical feedthrough integrated in the substrate between the physical parameter sensor arrangement and the optical microstructure, the optical feedthrough forming a communication path from within the sealed cavity to an area outside the sealed cavity and provided for communicating the measured physical parameter value; —measuring said physical parameter value inside the sealed cavity by means of the physical parameter sensor arrangement inside the sealed cavity; and —communicating the measured physical parameter value via the optical feedthrough to the area outside the sealed cavity.

In a further aspect, the present invention relates to an optical assembly as defined above, wherein the optical microstructure is positioned in the substrate to form an external optical interaction area on a part of a surface of the substrate, wherein the optical assembly further comprises a cover cap on at least a part of a surface of the substrate adjacent to the optical microstructure, a sealed cavity being formed between the surface and cover cap, a physical parameter sensor arrangement inside the sealed cavity, the associated physical parameter being a measure of hermeticity of the sealed cavity, and an optical feedthrough integrated in the substrate, the optical feedthrough being arranged to provide a communication path between the physical parameter sensor arrangement and an area outside the sealed cavity.

In embodiments according to the invention, an optical assembly is provided comprising a substrate with an optical microstructure integrated with the substrate, the optical microstructure comprising one or more integrated optical components which are fully or partially embedded, integrated or patterned in the substrate and which are positioned to form an optical interaction area above a part of a surface of the substrate, wherein the optical assembly further comprises: a cover cap on at least a part of a surface of the substrate adjacent to the optical microstructure, a sealed cavity being formed between the surface and cover cap; a physical parameter sensor arrangement with a sensor component inside the sealed cavity, provided for measuring a physical parameter inside the sealed cavity which is a measure of hermeticity of the sealed cavity; and an optical feedthrough integrated in the substrate between the physical parameter sensor arrangement and the optical microstructure, the optical feedthrough being arranged to provide a communication path between the physical parameter sensor arrangement and an area outside the sealed cavity.

As the present invention embodiments use techniques and technologies which are compatible with manufacturing steps for other elements of the optical assembly, it is possible to implement an efficient and cost-effective testing method. The present invention embodiments do not need any new manufacturing or assembling technologies other than the ones used for making the optical assembly anyway, thus making it cost effective. In some embodiments, the present invention can be implemented as an all optical approach e.g. using only photonic integrated circuits; not requiring to integrate other technologies such as MEMS or quartz crystals. The present invention embodiments allow to validate the hermeticity of an optical assembly, e.g. at wafer scale, without any additional cost and with extremely high sensitivity in a non-destructive manner. As an example wafer scale testing can be performed with optical beam scanning of the wafer which is contactless. Another advantage of the present invention is that even with optical testing, the cover cap can be made of a wide variety of materials, such as a metal or a non-transparent material.

SHORT DESCRIPTION OF DRAWINGS

The present invention will be discussed in more detail below, with reference to the attached drawings, in which FIG. 1 shows a schematic cross sectional view of an optical assembly according to a first embodiment of the present invention;

DESCRIPTION OF EMBODIMENTS

Optical assemblies generally consist of a plurality of optical and electronic components attached to a substrate or integrated into the substrate. For some of the applications in which an optical assembly is used, for e.g. in a hostile environment, a hermetic sealing is used to shield most of its optical and electrical components. It is often required that the hermeticity of this sealing is retained fora longer time, and at various life stages of the optical assembly from manufacturing to actual use. Hence testing the hermeticity is one of the main reliability issues in the case of an optical assembly.

Determination of the hermeticity in microelectronic packages is generally approached using some of the traditional methods such as helium leak detection or Fourier-Transform Infrared Spectroscopy. The helium leak detection method is not suited for small packages due to the resolution limit associated to the detection apparatus. Fourier-transform infrared spectroscopy measures the variation of gas concentration in a sealed cavity. One of the other prior art methods uses a membrane deflection measurement by exposing a sealed cavity to a different pressure between the inside and the outside. The pressure difference deflects a thin membrane in the cap and this deflection is detectable by e.g. an optical profilometry. Some methods to test hermeticity use a quartz crystal-based sensor positioned under the sealed cover cap. The aforementioned methods bear drawbacks that make the desired control of hermeticity and life-time prediction of miniaturized assemblies unreliable. Lack of sensitivity, destructive nature of certain methods, the need for elaborated micro-mechanical structures or the associated statistical validation methods are some of the disadvantages driving the necessity for alternative methods, such as presented herein.

Figure 1:
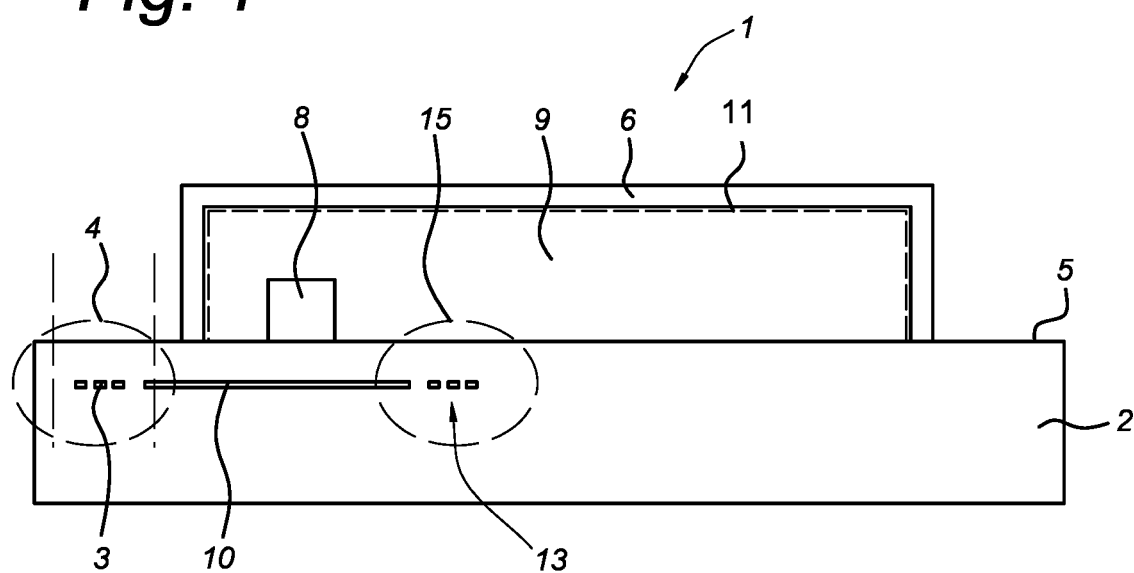

FIG. 1 shows a schematic cross sectional view of a first embodiment of an optical assembly 1 which is testable in accordance with the present invention. The method of hermeticity testing of the optical assembly 1 comprises providing an optical microstructure 3 integrated with the substrate 2, wherein the optical microstructure 3 is positioned (i.e. can be fully or partially embedded, integrated or patterned in the substrate 2) to form an external optical interaction area 4 on a part of a surface 5 of the substrate 2. The optical microstructure 3 can comprise one or more of a plurality of integrated optical components such as for example integrated waveguides, gratings, photonic crystals, cavities, ring resonators, couplers, splitters, filters and other optical (tuneable) elements. The optical microstructure 3 can be either active or passive. In the embodiment shown in FIG. 1, the optical microstructure 3 is an embedded grating in the substrate 2. In this first embodiment, the optical assembly 1 comprises a substrate 2 with an optical microstructure 3 being positioned in the substrate 2 to form an external optical interaction area 4 on a part of a surface 5 of the substrate 2. The optical assembly 1 further comprises a cover cap 6 on at least a part of a surface 5 of the substrate 2 adjacent to the optical microstructure 3. A sealed cavity 9 is thus present between the surface 5 and cover cap 6. A physical parameter sensor arrangement is positioned inside the sealed cavity 9 which measures a physical parameter associated with the hermeticity of the sealed cavity 9. An optical feedthrough 10 is integrated in the substrate 2 to provide a communication path between the physical parameter sensor and an area outside the sealed cavity 9. A sealing element, e.g. a soldering layer 11 as shown in the embodiment of FIG. 1 is e.g. arranged to allow a proper sealing line between the surface 5 and the covering cap 6 Alternative embodiments use a suitable material for the cover cap 6, which may then be directly heat sealed to the substrate surface 5 (the melting rim of covering cap 6 may then be regarded as the sealing element).

The optical assembly 1 as shown is, in accordance with a further aspect of the invention, manufactured using processing steps which as such are known to the skilled person, and tested using the capabilities provided by the optical feedthrough 10. In other words, the present invention relates to a method for testing an optical assembly 1, comprising providing a substrate 2 with an optical microstructure 3 integrated in the substrate 2, the optical microstructure 3 being positioned in the substrate to form an external optical interaction area 4 on a part of a surface 5 of the substrate 2, The method further comprises sealing a cover cap 6 to at least a part of the surface 5 of the substrate 2. The cover cap 6 is placed adjacent to the optical microstructure 3 in order to obtain a sealed cavity 9. The method further comprises providing an optical feedthrough 10 which is integrated or embedded in the substrate 2. The method measures a physical parameter value which is associated with a measure of the hermeticity of the sealed cavity 9. In other words, the value is measured of the physical parameter which is (directly or indirectly) associated to the hermeticity of the sealed cavity.

The optical feedthrough 10 forms an external communication path from within the sealed cavity 9 to the outside of the sealed cavity 9 for communicating the measured physical parameter value. The measured physical parameter value can be further processed, e.g. by determining a threshold crossing, a change of the physical parameter value in time (leak rate), or in two stages (e.g. two different (environmental) conditions), etc.

Thus the method measures the hermeticity in a non-destructive manner. The optical microstructure 3 for example be optically connected to the optical feedthrough 10 which is a waveguide and/or a coupler 13 for coupling and decoupling the radiation in and out of the cavity 9. One example of a coupler may be an on-chip vertical grating coupler (VGC). The optical feedthrough 10 may be arranged to be optically accessible externally from the optical assembly 1, e.g. from a top surface of the substrate 2 or from a bottom surface of the substrate 2.

Figure 2:
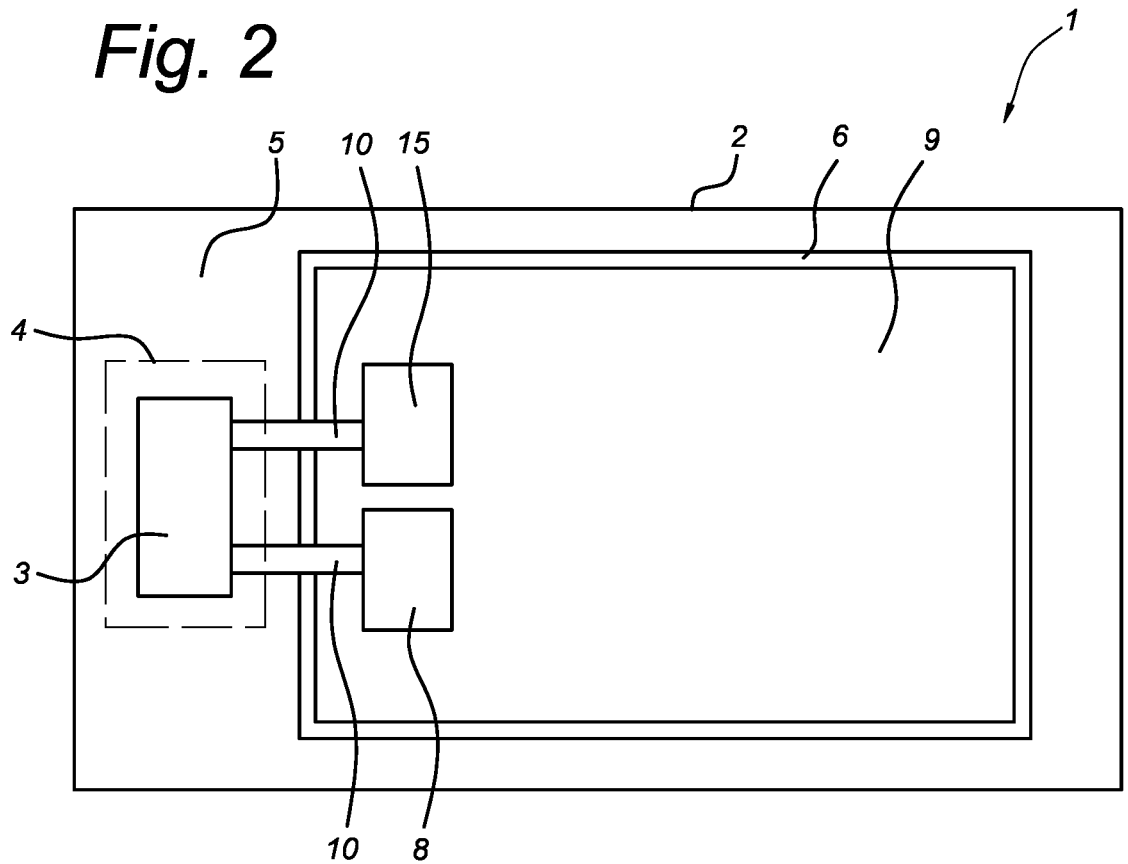
FIG. 2 shows a schematic top view of an optical assembly according to a further embodiment of the present invention.

The hermeticity of the sealed cavity 9 can be tested by sensing using an all optical method. In an embodiment the method of testing comprises measuring the physical parameter value by an optical measurement using an internal interaction area 15 which is provided within the sealed cavity 9, as shown in the embodiment of FIG. 1. In this embodiment the whole testing method comprises an all optical approach where the data (and also the operating energy) are provided through an optical path via the optical feedthrough 10 without having the necessity for an optoelectronic conversion, processing, or provision of an electrical energy supply on the optical assembly 1. FIG. 2 shows a schematic representation of a top view of the optical assembly 1 with the optical feedthrough 10 placed in such a way to allow optical communication from the outside of the sealed cavity 9 to the inside of the sealed cavity 9 and back.

In a group of embodiments, of which the embodiment of FIG. 1 is an example, the physical parameter sensor arrangement comprises an internal interaction area 15 within the sealed cavity 9. The internal interaction area 15 is in optical communication with the optical feedthrough 10 and is arranged to optically measure the physical parameter value inside the sealed cavity 9. This group of embodiments allows a full optical implementation for manufacturing and testing the sealed cavity 9 of the optical assembly 1. In an even further embodiment the internal interaction area 15 and optical feedthrough 10 are part of the integrated optical microstructure 3. The high degree of integration of the optical components in the optical assembly allow a very efficient and cost-effective manufacturing and testing.

Figure 3:
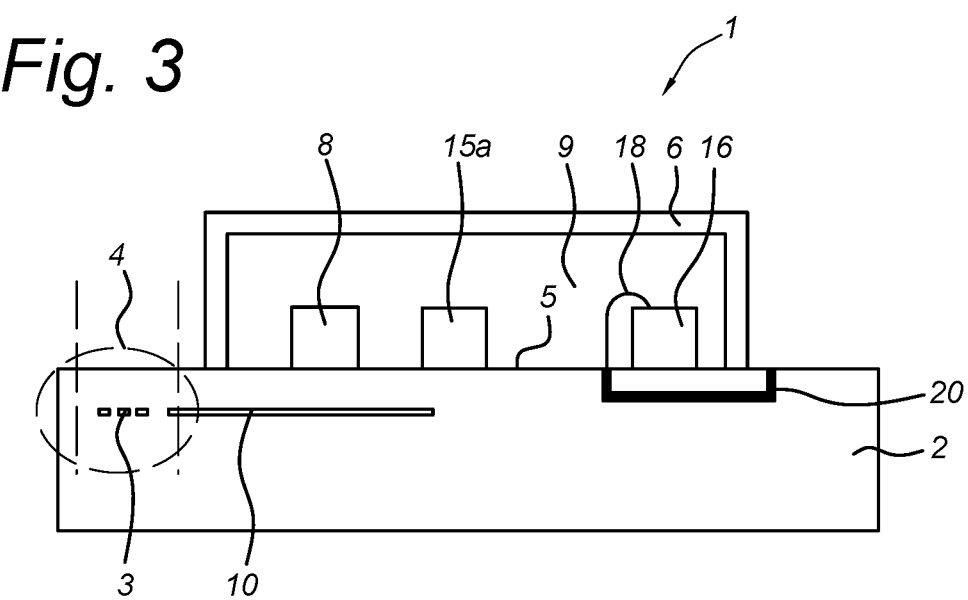
FIG. 3 shows a schematic cross sectional view of an optical assembly according to an even further embodiment of the present invention.

FIG. 3 shows a schematic cross sectional view of an optical assembly according to an even further embodiment of the present invention. In this embodiment, the physical parameter sensor arrangement comprises a physical parameter sensor component 15a positioned within the sealed cavity 9 and in operational communication with the optical feedthrough 10. In relation to the embodiment of the optical assembly as shown in FIG. 3, the testing method in a further embodiment may comprise providing a physical parameter sensor component 15a within the sealed cavity 9. Measuring the physical parameter value then comprises operating the physical parameter sensor component 15a via the optical feedthrough 10. By putting in a suitable sensor as the physical parameter sensor component 15a prior to sealing the cover cap 6 to at least a part of the surface 5, it is possible to provide any needed energy via the optical feedthrough 10. If the physical parameter component 15a would need electrical power supply, this could even be provided via an optoelectronic conversion, such as a PV cell.

In relation to the method embodiments described above, it is noted that the physical parameter, which is used to test the hermeticity of the sealed cavity 9, may be (but is not limited to) humidity, temperature, dew point, presence of a gas, etc. Similarly, in the optical assembly embodiments, the physical parameter sensor component 15a may be one or more of a humidity sensor, a temperature sensor, a dew point sensor, a gas sensor, etc.

In the exemplary embodiment shown in FIG. 3, the optical assembly 1 further comprises at least one electrical feedthrough 20 extending from the sealed cavity 9 to an area of the substrate 2 which is outside of the sealed cavity 9. The electrical feedthrough 20 allows electrical power transfer from the electrical or optoelectronic components integrated within the sealed cavity 9 to the external area of the sealed cavity 9. In this embodiment, next to the optoelectronic component 8, an additional electronic or optoelectronic component 16, is connected to the substrate surface 5 within the hermetically sealed cavity 9. This additional electronic device 16 can be e.g. a power supply unit 16. The electrical feedthrough 20 is e.g. made with a finishing (or plating) metal such as a gold, platinum or palladium layer. Inside the sealed cavity 9, the electrical feedthrough 20 is connected to the additional electronic component 16 by means of a bonding wire 18 (as such known from electronics packaging techniques). In an alternative or additional embodiment, the electrical feedthrough 20 can extend from the sealed cavity 9 to an area outside the sealed cavity 9. Such a via like electrical feedthrough 20 provides an electrical connection from within the sealed cavity 9 to outside, e.g. connection terminals. The electrical feedthrough 20 can be either embedded, patterned or integrated into the substrate surface 5 of the optical sensing assembly 1. An example method to fabricate this electrical feedthrough 20 is with through-silicon via (TSV) of a metal for e.g. copper.

Humidity sensors in general are arranged to sense the ingress of water vapour from the environment into the sealed cavity 9 over the optical assembly's lifetime. Humidity is a physical quantity that has significant importance in a number of areas ranging from life sciences to building automation. In the electronics industry, humidity monitoring is important as electronic items may malfunction due to high humidity. As a consequence, a wide range of sensor types are known in the prior art for humidity measurements. Generally, humidity sensors have been organized into categories such as electrical, mechanical and optical. Electronic humidity sensors are the most common type of sensors today. They have the shortcomings of drift and contamination-induced inaccuracy, which typically limits their accuracy making it even poorer in low RH environments. Additionally some of these sensors have too long response time in some applications. The poor accuracy, which is close to ±2%, especially at low and high humidity and wide hysteresis and poor linearity, insufficient temperature operational range and bad long term stability are some other drawbacks. The mechanical sensors are based mainly on change in the mechanical properties of some materials due to water absorption. Significant advances have been made over the last ten years in addressing the limitations of these sensors and improving their ease of use. In particular, there has been progress in improving the speed of response to below 1 second and in developing sensors that are compatible with silicon technology.

In one embodiment, the physical parameter sensor component 15a comprises a functionalization layer, e.g. an amplification layer. The amplification layer can be an added layer which can impact the refractive index of various layers of the optical microstructure 3. If the layer is susceptible to changes in a physical parameter related to the hermeticity of the cavity it will change it's properties with variations in the physical parameter. For example, the change can express itself in changes in the mechanical properties due to an affected stress distribution (e.g. mechanical changes through the absorption of gases such oxygen or hydrogen into a metal (e.g. platinum, palladium) layer). A further alternative for an amplification layer is a binding layer, e.g. a layer of a getter material. Getter materials would enhance the sensitivity of the hermeticity sensor, as they absorb substances such as humidity, gases or molecules (e.g. biomolecules) present in the package, thereby changing their refractive index.

Interferometric sensors are also a candidate to be used as the physical parameter sensor arrangement 15; 15a. In one exemplary embodiment the physical parameter sensor component 15a comprises a ring resonator The ring resonator is a compact wavelength selective device. The resonant wavelengths of ring resonators are highly affected by a change in its evanescent field which is utilised for using it as a strong evanescent field optical sensor for biological and chemical applications. In another exemplary embodiment, the physical parameter sensor component 15a can be based on a slot waveguide. A slot waveguide comprises two arms of high refractive indices separated by a slot region of low refractive index. In optical slot waveguides (e.g. fabricated in 501 technology by either e-beam or deep-UV lithography) the electric field discontinuity at the interface between high index contrast materials enables high optical confinement inside a nanometer-scale area (gap region) of low-index material. A variety of optical sensors can be realized using slot waveguides such as micro-ring resonators, disk resonators and one dimensional photonic crystals. The effective refractive index of the slot guiding structure is very sensitive to changes in the refractive index of its environment making it an efficient optical sensor. In an another exemplary embodiment, the physical parameter sensor component 15a can be based on a waveguide spiral. The light is guided by the spiral waveguide, configured to have the evanescent tail of the guided modes or mode overlapping the environment. In additional exemplary embodiments, the optical assembly comprises the physical parameter sensor component 15a with or without amplification layers.

Temperature sensor measure the variation in temperature in the sealed cavity 9. Temperature sensors made of photonic devices have the potential to provide greater temperature sensitivity while being robust against mechanical shock and electromagnetic interference. Furthermore, compactness and ability to multiplexing provide photonic temperature sensors as a low-cost sensing solution. Photonic temperature sensors exploit temperature dependent changes in a material's properties—typically, a combination of thermo-optic effect and thermal expansion. For e.g. the temperature dependence of the ring resonator arises from temperature-induced changes in refractive index and in the physical dimensions of the ring. Hermeticity can also be tested by measuring the dew point. The dew point is the temperature at which vapour begins to condense out of the gaseous phase. A compact, integrated photonic dew point sensor (DPS) can be used for sensing the dew point inside the cavity 9 with high accuracy, a small footprint, and fast response. E.g., a component of DPS can be a mirroring resonator, which can measure simultaneously: the condensed water droplets via evanescent field sensing and in situ temperature sensing via the thermo-optic effect. Another method to measure the hermeticity is by sensing the presence of a gas inside the cavity 9 by a photonic gas sensor. Thus the sensor component is placed inside the cavity 9. It is noted that the physical parameter sensor arrangement may be implemented as a photonic integrated humidity, temperature or gas sensor. This sensor can be a ring resonator, a Mach-Zehnder interferometer or other sensing element that is commonly used in photonic integrated circuits.

The method of testing hermeticity of the optical assembly 1 can be performed at various life stages of the optical assembly 1. In a further method embodiment of the present invention, the method comprises measuring the physical parameter value directly after sealing the cover cap 6. The hermeticity testing of the optical assembly 1 as described herein may be performed at a die or at a wafer level. Die level testing requires individual process for each die of optical assembly 1, which increases packaging cost and labour time and decreases the process yield and reliability. On the other hand, wafer level testing of the hermeticity provides a better solution in all the above aspects. The wafer level sealing uses well-known techniques, such as thin film encapsulation or wafer-to-wafer bonding, providing low-cost packaging solutions. Hermetic sealing by wafer-to-wafer bonding employs a separate cap wafer for the sealing purposes, which provides mechanical robustness for the protection of the sensors. The wafer level testing is performed in a non-destructive manner and possess the additional advantage of having cost-effective.

In an alternative or additional embodiment, the method comprises first completing the manufacturing of the optical assembly and then measuring the physical parameter value after completing the manufacturing of the optical assembly. E.g. a wafer with a plurality of optical assemblies 1 may be split in individual assemblies, and provision of terminals and final packaging may be first performed, after which the hermeticity is (again) tested.

In some applications, periodic health monitoring of the hermetic sealing may be advantageous, e.g. during long time storage. In an alternative or additional embodiment, the method comprises measuring the physical parameter value during storage of the optical assembly, e.g. at set intervals during the shelf life of the optical assembly 1. In an alternative or additional embodiment, the method comprises measuring the physical parameter value during operation of the optical assembly. Testing may then be performed prior to or during actual use of the optical assembly. For example, the optical assembly can be an implantable sensor whose hermeticity can be tested during its operation as an implant.

The photonic and/or electronic components of the optical assembly 1 can be integrated for example monolithically, heterogeneously or by a hybrid method. Monolithic integration is the integration technology that uses a single processing flow to process the diverse components potentially using different materials, e.g. integrated germanium detectors in silicon photonics Integrated Circuit (IC). Heterogeneous integration is the integration technology for which the components are processed in separate process flows, which are then integrated at die or wafer level, e.g. BCB bonding, wafer bonding, other bonding schemes or 3D integration. Hybrid integration is the integration of components or materials on processed photonic integrated platforms, e.g. flip-chipping of detectors, bumping, gluing, wire bonding, co-packaging, etc. The optical microstructure 3 can be implemented as part of a Photonic Integrated Circuit (PIC), which refers to a variety of forms and material systems used for making a photonic circuits. In one embodiment of the present invention, the optical assembly 1 comprises at least one photonic integrated circuit device. In a further embodiment of the present invention, the optical microstructure 3 is based on platforms such as low-index contrast waveguides (e.g. polymer, glass or silica, $Al_xGa_{1-x}As$, $In_x<Ga_{1-x}AsyP_{1-y}$), high-index contrast waveguides (e.g. Silicon-on-Insulator (SOI), SiN (silicon rich or stoichiometric silicon), semiconductor membranes), plasmonic (e.g. metal layers or metal nano-particles).

The optical microstructure 3 can be an integrated optical component, such as an integrated optical cavity, an integrated optical resonator, an integrated optical interferometer, an integrated optical coupler, an optical waveguide, a taper, a tuneable filter, a phase-shifter, a grating, a photonic crystal, a modulator, a detector, a source, a multiplexer, a demultiplexer or a combination thereof, embedded, integrated or patterned in the substrate 2. The optical microstructure 3 can be either active or passive. The optical microstructure 3 are integrated with the substrate as fully embedded or partially embedded structure, in order to form the optical interaction area 4 on the part of the substrate 2. Fabrication of the optical assembly 1 can be executed using various techniques, such as electron beam technology, photolithographic process, CMOS technology or a combination thereof. This can include material etching processes (e.g. wet etching, dry etching, reactive ion etching) and other typical back-end-of-line processes (e.g. metallization) or steps involving a heterogeneous integration of other micro-components on the substrate (e.g. flip-chipping, bonding) which are as such known to the person skilled in the art. The method of manufacturing the optical assembly 1 may be further using one of many thin film fabrication technologies which are known as such. For example this can be a Chemical Vapour Deposition (CVD), a Plasma Enhanced Chemical Vapour Deposition (PECVD), an Atomic Layer Deposition (ALD), a sputtering, a pulsed laser deposition (PLD) or a Molecular Beam Epitaxy (MBE) deposition technique. The devices and methods of the present invention embodiments are described for a wide range of materials including Si, Si compatible materials, III-V materials, polymer waveguides, SiN/SiOx. In an exemplary embodiment, the present invention relates to an embodiment wherein the optical assembly 1 is a SiN based material implementation. SiN is a very interesting material implementation for highly integrated photonic circuits. The high refractive index contrast allows photonic waveguides and waveguide components with submicron dimensions to guide, bend and control light on a very small scale so that various functions can be integrated on a chip. Moreover SiN offers a flexible platform for integration with surface plasmon based components which in turn allows for even higher levels of miniaturization.

Silicon photonics, e.g. SiN, or SOI based optical microstructures 3, allow a high level of miniaturization, which is advantageous. Furthermore, light can be efficiently coupled in and out the optical microstructure 3 by use of e.g. a grating coupler or another coupling element. Using SOI also has some technological advantages. Due to the CMOS industry, silicon photonics technology has reached a level of maturity that outperforms any other plane chip manufacturing technique by several orders of magnitude in terms of performance, reproducibility and throughput. Silicon photonics ICs can be fabricated with a reproducible and well-controlled wafer scale-processes, meaning that a wafer (typically 200 mm or 300 mm diameter) can contain a high number of photonic integrated circuits. Combined with the commercial availability of large wafers at a relative moderate cost, this means that the price per optical assembly 1 can be very low.

The reference made to light or radiation in the present application refers to electromagnetic radiation. The light envisaged is radiation having a suitable wavelength or wavelength range for sensing, i.e. detecting or imaging, a substance. In some embodiments light used can be visible radiation, IR radiation, e.g. near IR radiation or mid IR radiation. In some embodiments, the radiation has a wavelength or wavelength range between 700 nm and 2500 nm, or between 2.5 µm and 8 µm, or a combination thereof, although the present invention embodiments are not limited thereto. For example the fabrication and integration technologies for the silicon photonics are well developed in the telecommunication wavelength range which is centred on 1550 nm and extendable to shorter wavelengths, and which could be exploited for easy, reliable and cost-effective manufacturing of the present invention optical assembly 1.

In one embodiment of the present invention, the external optical interaction area 4 can be an evanescent field sensor such as an implantable or (partially) immersed sensor. In an optical microstructure 3, although most of the light is confined within a guiding layer (e.g. implemented as waveguides), a small portion, called the evanescent field, extends out into an external medium (e.g. the substrate 2 material and/or the optical interaction area 4). This evanescent field falls off exponentially as the distance from the waveguide surface increases, and is effectively zero at a distance less than one-half the wavelength of the coupled light.

In an alternative or additional embodiment, the optical microsystem assembly 1 further comprises an optoelectronic conversion device positioned inside the sealed cavity 9. For example an energy supply device 16 is used for supplying the required energy for all (opto) electronic components of the optical assembly 1. The energy supply device 16 is in one specific embodiment an energy storage, e.g. a micro battery, or in a further specific embodiment an energy harvesting device. A micro battery supplies fixed energy density in a limited lifetime, depending on the size of micro battery and the energy demands of the (opto)electronic components. Energy harvesting devices generate electric energy from their surroundings through direct energy conversion, e.g. infrared radiant energy, thermal energy (solar-thermal, geothermal gradients of temperature, combustion), kinetic energy (wind, gravity, vibration), wireless transfer energy and RF radiation energy (inductive and capacitive coupling). It is noted that in the embodiments described above with reference to FIG. 1-3, the optoelectronic component 8 may be a radiation source whose radiation is used for e.g. sensing a substance. The light source might be one or more broadband sources (LED, SLED), a single narrow-band source (e.g. a laser, such as a VCSEL, a DFB laser, a DBR laser), or an ensemble of narrow-band sources. The reference made to light or radiation in the present description refers to electromagnetic radiation. The light envisaged is radiation having a suitable wavelength or wavelength range for sensing a certain substance. In some embodiments light used will be infrared radiation, e.g. near IR radiation or mid IR radiation. In some embodiments light used will be visible radiation. The fabrication and integration technologies for the silicon photonics are well developed in the telecommunication wavelength range which is centred on 1550 nm and extendable to shorter wavelengths, and which could be exploited for easy, reliable and cost-effective manufacturing of the present invention optical assembly 1. Additionally photodetectors may be integrated on the substrate surface 5 within the sealed cavity 9 provided by the hermetically sealed cover cap 6. The photodetectors are used to convert the optical signals into electrical signals. The photodetector might be a photodiode or a photoconductor, or an ensemble of these elements. There may be additional electronic components integrated within the hermetic sealing such as a monitor photodiode, a wireless module or even an amplifier. The often bulky electronic and optoelectronic components 8, 16 as described above (as opposed to integrated optical elements) are attached (e.g. glued) to the substrate surface 5, and a connection to the optional electrical feedthrough, or internal connections can be provided using wire bonds 18.

The present invention has been described above with reference to a number of exemplary embodiments as shown in the drawings. Modifications and alternative implementations of some parts or elements are possible, and are included in the scope of protection as defined in the appended claims.

The invention claimed is:
1. A method for testing an optical assembly, comprising providing a substrate with an optical microstructure integrated with the substrate, the optical microstructure comprising one or more integrated optical components which are fully or partially embedded, integrated or patterned in the substrate and which are positioned to form an optical interaction area above a part of a surface of the substrate, sealing a cover cap to at least a part of a surface of the substrate adjacent to the optical microstructure, thereby obtaining a sealed cavity, providing a physical parameter sensor arrangement for measuring a physical parameter inside the sealed cavity which is a measure of hermeticity of the sealed cavity, providing an optical feedthrough integrated in the substrate between the physical parameter sensor arrangement and the optical microstructure, the optical feedthrough forming a communication path from within the sealed cavity to an area outside the sealed cavity and provided for communicating the measured physical parameter value, measuring said physical parameter value inside the sealed cavity by means of the physical parameter sensor arrangement inside the sealed cavity, and communicating the measured physical parameter value via the optical feedthrough to the area outside the sealed cavity.

2. The method according to 1, wherein measuring the physical parameter value comprises an optical measurement using an internal interaction area provided within the sealed cavity.

3. The method according to 1, further comprising providing a physical parameter sensor component within the sealed cavity, and wherein measuring the physical parameter value comprises operating the physical parameter sensor component via the optical feedthrough.

4. The method according to claim 1, wherein the physical parameter value is measured directly after sealing the cover cap.

5. The method according to claim 1, further comprising completing manufacturing of the optical assembly, and wherein the physical parameter value is measured after completing the manufacturing of the optical assembly.

6. The method according to claim 1, wherein the physical parameter value is measured during storage or during operation of the optical assembly.

7. The method according to claim 1, wherein the physical parameter is one or more of: humidity, temperature, dew point or presence of a gas.

8. An optical assembly comprising a substrate with an optical microstructure integrated with the substrate, the optical microstructure comprising one or more integrated optical components which are fully or partially embedded, integrated or patterned in the substrate and which are positioned to form an optical interaction area above a part of a surface of the substrate, a cover cap on at least a part of a surface of the substrate adjacent to the optical microstructure, a sealed cavity being formed between the surface and cover cap, a physical parameter sensor arrangement with a sensor component inside the sealed cavity, provided for measuring a physical parameter inside the sealed cavity which is a measure of hermeticity of the sealed cavity, and an optical feedthrough integrated in the substrate between the physical parameter sensor arrangement and the optical microstructure, the optical feedthrough being arranged to provide a communication path between the physical parameter sensor arrangement and an area outside the sealed cavity.

9. The optical assembly according to 8, wherein the physical parameter sensor arrangement comprises an on-chip vertical grating coupler (VGC) for coupling and decoupling radiation in and out of the cavity, thus forming an internal interaction area within the sealed cavity for optically measure the physical parameter value inside the sealed cavity, the internal interaction area being in optical communication with the optical feedthrough via the on-chip VGC.

10. The optical assembly according to 9, wherein the on-chip VGC and optical feedthrough are part of the integrated optical microstructure.

11. The optical assembly according to 8, wherein the physical parameter sensor arrangement comprises a physical parameter sensor component positioned within the sealed cavity and in operational communication with the optical feedthrough.

12. The optical assembly according to 11, further comprising at least one electrical feedthrough extending from inside the sealed cavity to an area outside the sealed cavity.

13. The optical assembly according to claim 8, wherein the physical parameter sensor component is one or more of: a humidity sensor, a temperature sensor, a dew point sensor, a gas sensor.

14. The optical assembly according to claim 8, wherein the physical parameter sensor component comprises a ring resonator.

15. The optical assembly according to claim 8, wherein the physical parameter sensor component comprises a functionalization layer, for example an amplification layer.

* * * * *